United States Patent

[11] 3,603,169

| [72] | Inventor | Matthew R. Fandetti |
| | | Brunswick, Maine |
| [21] | Appl. No. | 17,133 |
| [22] | Filed | Mar. 6, 1970 |
| [45] | Patented | Sept. 7, 1971 |
| [73] | Assignees | Pine Tree Engineering |
| | | Brunswick, Maine; |
| | | Cardwell Manufacturing Company, Inc. |
| | | Wichita, Kans. |

[54] POSITION CONTROL DEVICE
6 Claims, 5 Drawing Figs.

[52] U.S. Cl. .................................................. 74/501.5,
254/172, 254/173, 200/47
[51] Int. Cl. .................................................. B66d 1/56,
B66d 1/50, H01h 3/16
[50] Field of Search .......................................... 254/172,
173; 74/501.5; 200/47, 153.19

[56] References Cited
UNITED STATES PATENTS

| 926,884 | 1909 | Libby | 200/47 X |
| 959,998 | 1910 | Coyle | 254/173 |
| 1,474,446 | 1923 | Schroeder | 254/173 |
| 1,433,079 | 1922 | Jett | 254/172 |
| 1,931,071 | 1933 | Halstead | 254/172 |
| 1,970,596 | 1934 | Coberly | 254/173 |
| 2,249,947 | 1941 | Doe | 254/172 |
| 2,912,224 | 1959 | Logan | 254/173 |
| 3,158,699 | 1964 | Vegsund | 200/18 |

*Primary Examiner*—William F. O'Dea
*Assistant Examiner*—Thomas R. Hampshire
*Attorney*—Nicholas J. Aquilino

ABSTRACT: An automatic linear or angular position control device for regulating the position of a given point in one plane, through a selected range, by the means of pulleys, springs, cams and switches. This type of device is used to activate various types of force developing equipments to move the given point as commanded by the position control.

INVENTOR
MATTHEW R. FANDETTI
BY Nicholas J. Aquilino
ATTORNEY

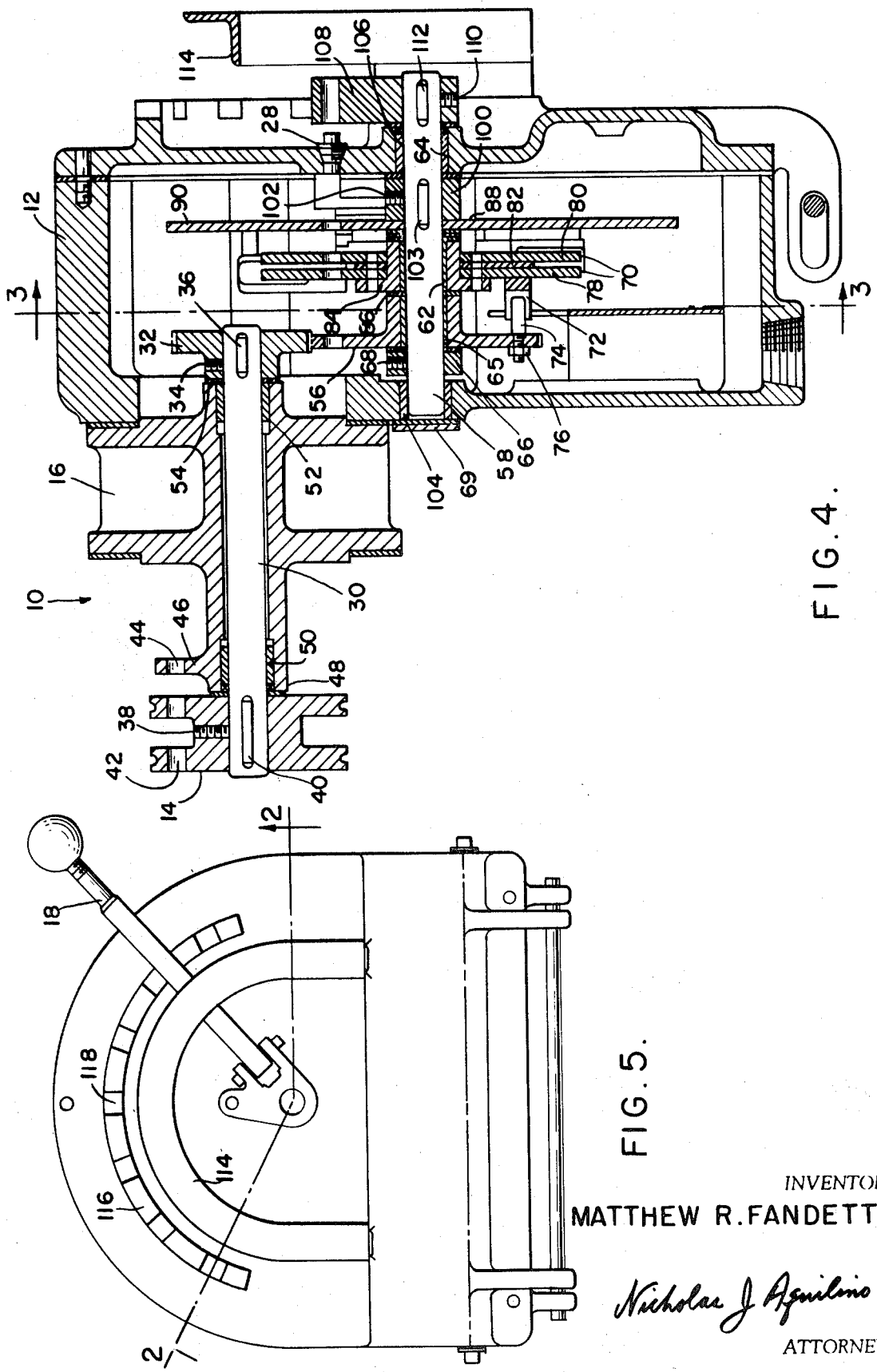

POSITION CONTROL DEVICE

BACKGROUND OF THE INVENTION

There are a number of applications wherein it is desirable to maintain a specific position relative to a base point, where the base point has variable position or range. Such applications include among others hose handling for marine applications, cargo transfer, cable tensioning (winches), steering gear followup (marine) and so forth, to mention a few. The use of such a device alleviates the necessity of frequent manual corrections. Control can vary by the means of a selection lever.

SUMMARY OF THE INVENTION

The present invention relates to an automatic linear or angular position control device adapted to regulate and maintain the position of a given point automatically regardless of load changes. The position control device also provides an adjustment means by which the sensitivity of the device may be increased or decreased.

Among the objects of the present invention is the provision of a position control device to automatically regulate the tension of a line in response to angular or linear movement of a tension measuring device such as a spring or dynamometer.

Other objects and further applicability of the present invention will become more apparent when taken in conjunction with the accompanying drawings.

BRIEF DESCRIPTION OF THE DRAWINGS

FIG. 4 is a sectional view taken along line 4—4 of FIG. 3;
and
FIG. 5 is an end view of the position control device.

DESCRIPTION OF THE PREFERRED EMBODIMENT

Figure 1:
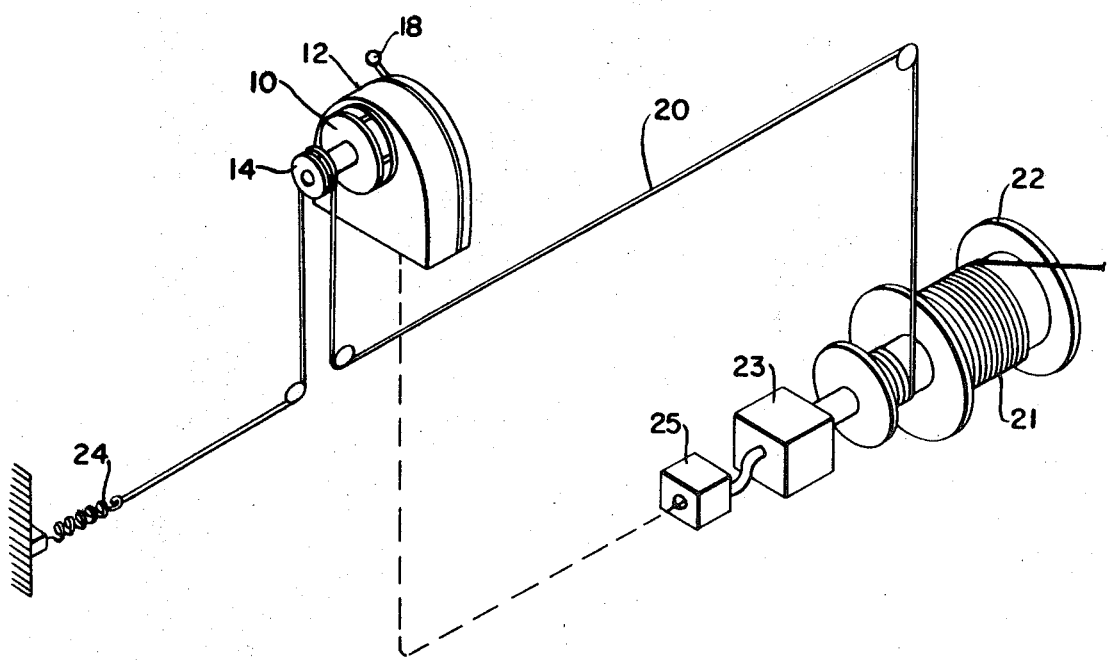
FIG. 1 is a diagrammatic view of the position control device of the present invention.
Figure 2:
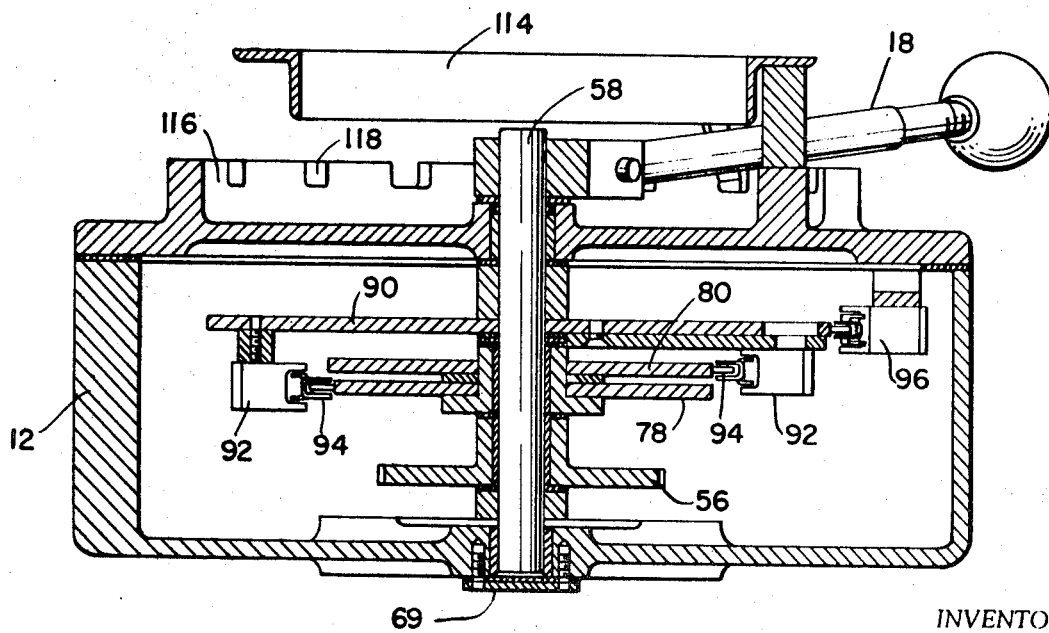
FIG. 2 is a sectional view taken along line 2—2 of FIG. 5.

The automatic linear or angular positioning control device 10, is illustrated in FIG. 1 as an automatic tension control device. It includes a housing 12, double sheave or pulley 14 coupled to the internal mechanism of the device by a connector 16 and a handle 18 having a number of settings for control of the degree of tension required. A cable 20, one end of which is coupled to a member 22 whose position is to be controlled. The member 22 is shown as a cable spool from which a cable 21 may unwind by means of a displacing force shown in the direction of the arrow. However, it will be appreciated the tension control device of the present invention may be used to balance other forces, for example, a brake or the like. The other end of the cable 20 is fixed to a spring 24 which is fixed and provides a signal balancing means. The cable 20 is wrapped around the pulley sheave 14 between the spring 24 and the member 22 to be controlled. A force restoring means 23 is operably connected to the spool member 22. A control means 25 receives signals from the tension control device 10 and controls the position of the force-restoring means 23. The control means 25 preferably may be any suitable electrical or electronic switching means while the force restoring means 23 preferably would be a motor and associated coupling means suitable for turning the spool member 22.

The details of the position control device 10 are illustrated in FIG. 2 to 5. The housing 12 is formed of two cast sections 12a and 12b which enclose the working portions of the tension control device.

The housing 12 includes a means for storage of two preset pins 26 (see FIG. 3) which are used for alignment, as hereinbelow described. The connector 16 which is screwed to the upper portion of the housing section 12b by bolts (not shown) is hollow and carries a pulley shaft 30, one end of which is connected to a gear 32 by means of a set screw 34 and a key 30 by another set screw 38 and a key 40. The pulley 14 is provided with a hole 42 which is aligned with another hole 44 on an extension 46 of the connector 16 so the pulley 14 may be locked against rotational movement by the use of one of the preset pins 26 during setup and/or repair to maintain relative positions of pulley 14 and gear 32. Suitable bearings 48, 50, 52 and 54 are provided between the pulley shaft 30 and connector 16 to insure close tolerances and proper mounting positions. The gear 32 meshes with a second gear 56 which is mounted on a control shaft 58 by bearings 60, 62, and 64 together with a collar 66 and a set screw 68. A screwed-on end cap 69 at the point where the control shaft 58 meets the housing 12 provides a seal to protect the interior of the tension control device 10. The gear 56 is operably coupled to a double faced cam 70 by means of a bracket 72, one end of which is secured to the cam 70 and the other end of which is secured to the gear 56 by a pin 74 and a nut 76.

The cam 70 is formed of two plates 78 and 80 and a spacer 82. The cam 70 is mounted on the control shaft 58 by a cam hub 84 and suitable bearings 86 and 88.

Figure 3:
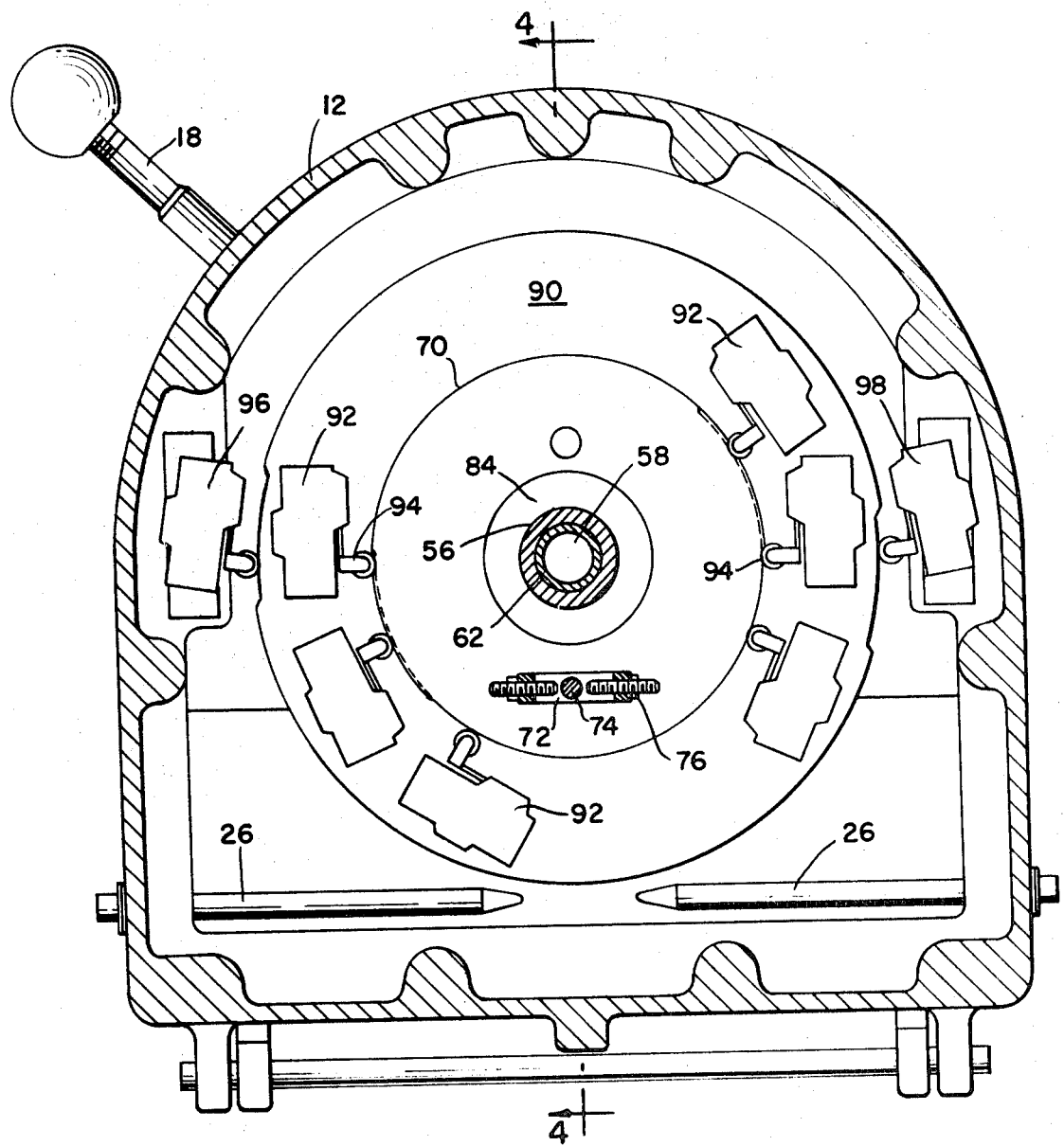
FIG. 3 is a sectional view taken along line 3—3 of FIG. 4.

Mounted adjacent to the cam 70 on the control shaft 58 is a switch plate 90 which carries a plurality of microswitches 92 arranged concentrically around the switch plate 90, as shown in FIG. 3. In the embodiment shown, cam plate 78 actuates two microswitches 92 and cam plate 80 actuates four microswitches 92 in response to the clockwise and counter clockwise movements of the pulley 14. The switches 92 are electrically connected to the control means 25 in a conventional manner. Each of the switches 92 is provided with an actuator 94 in the form of a roller cam follower which rides along the surfaces of the cams 78 and 80. The switchplate 90 is also provided with camming surfaces to actuate an off switch 96. It may be preferable to provide a duplex off system for the device. In such an arrangement, a second off switch 98 is provided so as to be actuated by a camming surface on the switch plate 90.

The control shaft 58 is rotatably mounted in the housing 12 by two bearings 104 and 106. A collar 100 is secured to the control shaft 58 by a setscrew 102 and key 103 and positions the switch plate 90 on the control shaft 58. The gear 56 and cam plates 78 and 80 are allowed to rotate independently with relation to switch plate 90 and control shaft 58. The handle 18 is pivotally mounted on a handle hub 108 which in turn is coupled to the control shaft 58 by a set screw 110 and a key 112. The handle 18 and the switch plate 90 move together through the common control shaft 58, therefore, any movement of the handle 18 will relocate the switch plate with respect to the off switches 96 and 98 and cause the microswitches 92 to move relative to the cam 70.

As shown in FIG. 5, a guide 114 serves to position the handle 18 as it is moved between the various position settings 1 to 6 and OFF. The housing section 12a is provided with a raised flange member 116 which includes a series of notches 118 which correspond to the various handle positions so that the handle 18 may be retained in a set position without slipping, thereby also positioning the switch plate 90 relative to the cam plates 78 and 80 for a particular control setting.

An alignment hole through the gear 56, the cam plates 78 and 80, the switchplate 90, and the housing 12 is provided to receive one of the preset pins 26 to maintain relative positions of gear, cam plates and switch plates during repair and/or servicing. The alignment hole is tapped to accept a pipe plug 28 which remains in place until use of a preset pin 26 is needed. The preset pins 26 have a pipe plug type head to be adaptable with alignment hole.

The operation of the position control device may be described as follows:

With a cable 20 attached to the pulley 14 and to a member 22 to be controlled, the handle 18 is set at one of the six tension control positions for the particular degree of tension required. This in turn sets the switch plate 90 and its switches 92 to a desired position relative to the cam 70. Since the switchplate 90 will determine which switches are actuated by the camming surfaces of the cam plates 78 and 80. When a displacing force is applied to the member 22 to be controlled, the cable 20 is moved linearly which in turn rotates the pulley 14. The gear 32 is then moved causing gear 56 meshing with it to also turn. This causes rotational movement of the cam plates 78 and 80, through the bracket 72, to actuate a particular one of the microswitches 92. The control mean 25 is energized to actuate the force restoring means 23 which in turn moves the spool member 22 and cable 20 to rebalance the system. This process is automatically continued for each displacing force applied to the member 22 to maintain the system in balance. Movement of the handle 18 to the OFF position causes the OFF switch 96 to be actuated and render the system inoperative. The driving means causes the member to be controlled to move, which in turn causes cable 20 to rotate pulley 14, which moves gear 32 that meshes with gear 56 that is operably connected to cams 78 and 80 that deactivate switches 92 on switch plate 90. Thereafter, movement of the member 22 to be controlled produces movement of the cable 20 which again sets the aforementioned process into operation.

I claim:

1. A control mechanism for devices which are subjected to variable loading comprising a housing, a rotation sensing and transmitting element journaled on said housing, a control shaft journaled on said housing in spaced relation to said element, a control cam mounted on the control shaft and rotatable relative thereto, a gear freely rotatably mounted on the control shaft and coupled to said control cam, a gear on said rotation sensing and transmitting element and rotatable therewith and meshing with and driving the gear on the control shaft, a switch mounting plate secured to the control shaft and rotating therewith and having a peripheral cam part, circumferentially spaced control switches on said switch-mounting plate and movable therewith and having switch actuators which engage the periphery of said control cam, at least one stop switch secured to the housing and having an actuator engaging the peripheral cam part of said switch-mounting plate, and a lever means secured to the control shaft to turn the same with the switch-mounting plate relative to said control cam, said gear on the control shaft and relative to said stop 2. The structure of claim 1, and said rotation sensing and transmitting element comprising a pulley adapted for connection with a cable leading from a device subjected to variable loading, a first shaft carrying the pulley and journaled for rotation on said housing and also carrying the second-named gear meshing with the gear on the control shaft.

3. The structure of claim 2, and said first shaft and control shaft being in parallel spaced relation on said housing.

4. The structure of claim 1, and said control cam consisting of a pair of coaxial cam discs each having peripheral cam surfaces, a first group of said control switches on said switch-mounting plate having their actuators engaging the cam surfaces of one disc and a second group of said switches having their actuators engaging the cam surfaces of the other disc.

5. The structure of claim 4, and a pair of opposing stop switches on the housing on opposite sides of the switch-mounting plate, said mounting plate having substantially diametrically opposed cam parts, and the actuators of said stop switches engaging said cam parts of said mounting plate.

6. The structure of claim 1, and said lever means comprising a manually operable radial handle on said control shaft at one end of the housing, and arcuate multiposition detent means for the handle on said one end enabling the handle to be releasably locked in selected angularly adjusted positions with the control shaft and said switch-mounting plate.